United States Patent
Tyndall

(10) Patent No.: US 6,650,656 B2
(45) Date of Patent: Nov. 18, 2003

(54) METHOD AND SYSTEM FOR RECONCILING EXTENDED COPY COMMAND TARGET DESCRIPTOR LENGTHS

(75) Inventor: John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 1 day.

(21) Appl. No.: 10/085,962

(22) Filed: Feb. 28, 2002

(65) Prior Publication Data

US 2002/0146035 A1 Oct. 10, 2002

Related U.S. Application Data

(60) Provisional application No. 60/272,339, filed on Feb. 28, 2001.

(51) Int. Cl.$^7$ ............................... H04J 3/16; H04J 3/92
(52) U.S. Cl. ....................................... 370/470; 709/200
(58) Field of Search ................................ 370/400, 401, 370/389, 470, 465, 428, 429; 709/200, 217, 223

(56) References Cited

U.S. PATENT DOCUMENTS

| | | | | |
|---|---|---|---|---|
| 6,209,023 | B1 | * 3/2001 | Dimitroff et al. | ........... 709/211 |
| 6,400,730 | B1 | * 6/2002 | Latif et al. | ........... 370/466 |
| 2002/0099797 | A1 | * 7/2002 | Merrell et al. | ........... 709/219 |
| 2002/0156942 | A1 | * 10/2002 | Tyndall | ........... 710/5 |
| 2002/0156984 | A1 | * 10/2002 | Padovano | ........... 711/148 |
| 2002/0194429 | A1 | * 12/2002 | Chiu et al. | ........... 711/118 |

OTHER PUBLICATIONS

PCT Search Report dated Oct. 31, 2002.
Steve Wilson "Working Draft SCSI Extended Copy Command" 'Online! Apr. 2, 1999. T10 Technical Committee XP002217164.

* cited by examiner

*Primary Examiner*—Ajit Patel
(74) *Attorney, Agent, or Firm*—Gray Cary Ware & Friedenrich, LLP

(57) ABSTRACT

A method and system are disclosed for reconciling extended copy command target descriptor lengths. One embodiment of the method comprises, in a router: receiving an extended copy command from a first host; comparing a first segment length to a target descriptor list length ("TDLL"), wherein the first segment length is the segment length as set by a first specification associated with the first host and wherein the TDLL is the segment length as set by a second specification associated with the router; if the first segment length is equal to the TDLL, setting a TDLL adjustment to a value of zero; if the first segment length is not equal to the TDLL, determining if the first segment length minus four bytes is equal to the TDLL; if the first segment length minus four bytes is equal to the TDLL, then setting the TDLL adjustment to a value of four; else, determining if a subsequent segment type is valid; if the subsequent segment type is valid, setting the TDLL adjustment to a value of zero; if the subsequent segment type is not valid, setting the TDLL adjustment to a value of four; and applying the TDLL adjustment to the TDLL. The extended copy command can be a SCSI extended copy command.

1 Claim, 2 Drawing Sheets

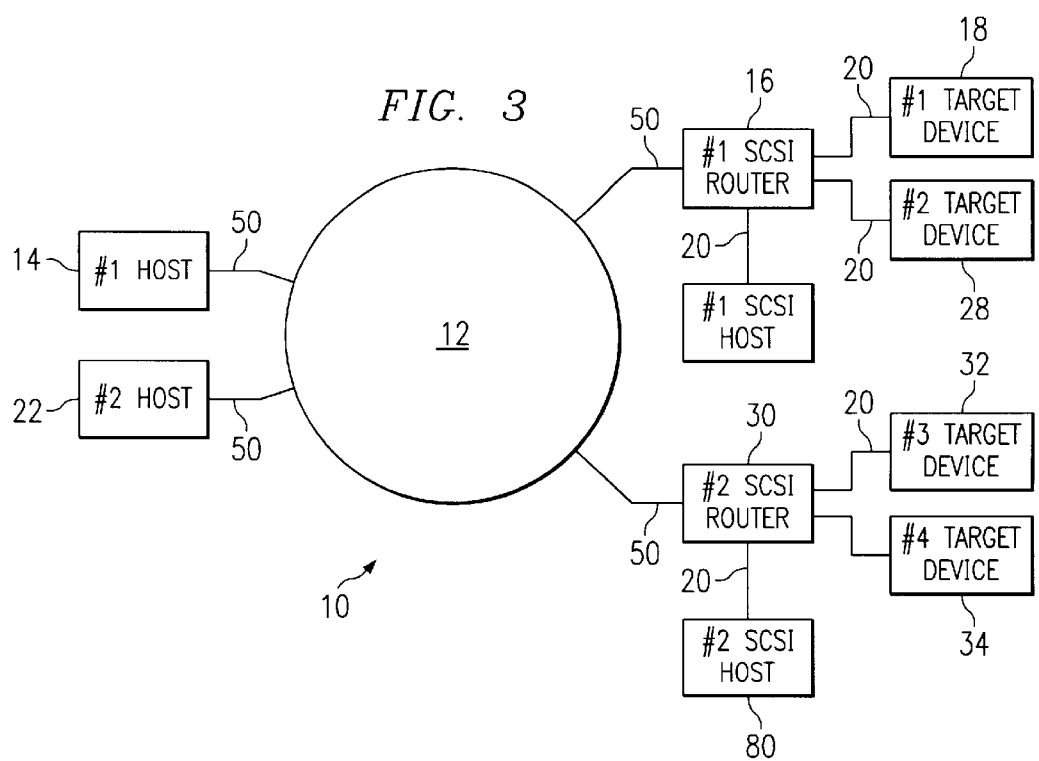

METHOD AND SYSTEM FOR RECONCILING EXTENDED COPY COMMAND TARGET DESCRIPTOR LENGTHS

RELATED INFORMATION

This application claims priority under 35 U.S.C.§119(e) to U.S. Patent Application No. 60/272,339, entitled "Method and System for Reconciling Target Descriptor Length of the SCSI Extended Copy Command" by John Tyndall, filed on Feb. 28, 2001, which is incorporated by reference as if set forth in its entirety herein.

TECHNICAL FIELD OF THE INVENTION

This invention relates generally to data and information communication systems and their operation, and, more particularly, to the field of storage area networking. Even more particularly, the present invention relates to Fibre Channel-to-SCSI storage area networks (SANs) and to a method and system for parsing ambiguous extended copy command target descriptors.

BACKGROUND OF THE INVENTION

Dramatic growth in the amount of data that must be stored by organizations, combined with the need for faster, more reliable and more efficient data access and data management capabilities, have led many organizations to seek an improved way of storing, accessing and managing data. In many traditional computer networks, the computer protocol used to connect network components and transfer data between, for example, a server and a storage device, is the small computer system interface, or "SCSI". As data storage and retrieval requirements increase, the need for fast, efficient and reliable data storage and retrieval solutions is also increasing.

For example, one problem that exists in the SCSI protocol is that when performing a data backup operation, a host device will typically read data from a source device into the host device and then write the data to a destination device, for example, a tape backup drive. The host device thus remains occupied during the entire backup operation, and its resources cannot be devoted to other operations. Furthermore, in most organizations today, data backup— creating a duplicate copy of data to protect it from corruption or loss—is accomplished by moving large volumes of stored data from a dedicated storage device over a primary computer network to a backup storage device. Since the primary computer network is also responsible for conducting day-to-day computing operations, this added data movement results in substantial congestion, slowing day-to-day computing operations.

The SCSI protocol extended copy command and the use of storage area networks (SANs), which are computer networks dedicated to data storage, can help resolve some of these problems. The SCSI extended copy command is a copy command that releases the host's resources during a backup operation by transferring responsibility for performing the backup operation to a different processor on a copy manager device, such as a router (e.g., a Fibre Channel-to-SCSI router), that supports the extended copy command. The host is thus free to perform other operations for the network while the copy manager device directs the backup operation.

Storage area networks use a different, higher performance, computer protocol, known as Fibre Channel, to transfer data. A storage area network also allows many servers to connect to and share access with many storage devices. The many-to-many connection enabled by the storage area network, combined with the Fibre Channel protocol, permits faster, more efficient, more reliable and more manageable data transfer processes. Furthermore, a storage area network can be used to perform data backup operations, instead of the primary computer network, thus substantially reducing congestion on the primary computer network and allowing more efficient day-to-day network operations.

Most current storage devices continue to be sold with the small computer system interface. Additionally, most organizations have made significant investments in storage devices and servers that use the small computer system interface. Therefore, in order for storage area network devices that use the Fibre Channel protocol to function with storage devices that use the SCSI protocol, Fibre Channel-to-SCSI storage routers must be installed between these devices. In particular, storage routers are essential to shifting data backup processes from a primary computer network to the storage area network, since most data backup storage devices use the SCSI interface and can only connect to the storage area network through a storage router. As new computer protocols are introduced, storage routers will be increasingly essential to enable rapid, seamless communication among servers, storage devices and storage area network devices that use diverse protocols.

The extended copy command provides a means to copy data from one set of logical units to another set of logical units or to the same set of logical units. The device that receives and executes the extended copy command is called a copy manager, and can be a router such as the Fibre Channel-to-SCSI router previously discussed. The copy manager is responsible for copying data from a first logical unit(s) (source device(s)) to a second logical unit(s) (destination device(s)). These logical units may reside on different SCSI devices or on the same SCSI device (in fact, all devices and the copy manager may be the same logical unit). Before the copy manager is instructed to move data, the application controlling the data movement (the copy manager software) shall independently execute any activities necessary to prepare the devices for the extended copy command. These activities can include media change commands, the loading of tapes, mode select commands, positioning of the tape on a backup device, etc. After all preparatory actions have been accomplished, the extended copy command can be issued by a host to the copy manager to start the data transfer.

However, even when using storage area networks, with their support for the SCSI extended copy command, some backup software implementations of the SCSI extended copy command are incompatible with the copy manager software used by certain copy manager devices, such as Fibre Channel-to-SCSI routers. The SCSI extended copy command is presently described in the T10\99-143r1 Specification (the "143r1 specification"). An extended copy command can reference one or more target devices (which are the source and/or the destination logical units), where each target device is described by a target descriptor. The 143r1 specification specifies that the extended copy command target descriptor length is to be equal to the number of bytes of the target descriptor.

However, the Legato implementation of the SCSI extended copy command, though claiming to be based on the 143r1 specification, set the target descriptor length equal to the byte length of the target descriptor minus the byte length of the header (i.e., actual length minus four bytes). This causes confusion, particularly when first implementing an extended copy command. Many current copy manager software simply implement the Legato implementation mistake, and are therefore incompatible with the extended copy command standard as outlined in the 143r1 specification. Conversely, solutions that implement the 143r1 specification are incompatible with the Legato implementation.

SUMMARY OF THE INVENTION

Therefore, a need exists for a method and system for reconciling the target descriptor length of a SCSI extended copy command such that extended copy commands built to either the 143r1 specification or to the Legato implementation of the 143r1 specification can be accepted and effectively executed by a copy manager device and its associated copy manager software.

A further need exists for a method and system for reconciling the target descriptor length of a SCSI extended copy command that can be implemented within a router such, as a Fibre Channel-to-SCSI router, so that a storage area network, such as a Fibre Channel-to-SCSI storage area network, can be more effectively used to relieve a primary computer network of data backup functions.

The present invention provides a method and system for reconciling target descriptor lengths of a SCSI extended copy command that substantially eliminate or reduce the disadvantages and problems associated with the use of the SCSI extended copy command as presently implemented in the 143r1 specification and the Legato implementation of the 143r1 specification.

In particular, the present invention provides a method and system for processing the target descriptor list of a SCSI extended copy command, at a router, by determining the target descriptor length implemented within the received extended copy command and adjusting the target descriptor list length implemented within the router to accept and execute the received extended copy command. One embodiment of the present invention is a method for reconciling extended copy command target descriptor lengths, comprising, in a router: receiving an extended copy command from a first host; comparing a first segment length to a target descriptor list length ("TDLL"), wherein the first segment length is the segment length as set by a first specification associated with the first host and wherein the TDLL is the segment length as set by a second specification associated with the router; if the first segment length is equal to the TDLL, setting a TDLL adjustment to a value of zero; if the first segment length is not equal to the TDLL, determining if the first segment length minus four bytes is equal to the TDLL; if the first segment length minus four bytes is equal to the TDLL, then setting the TDLL adjustment to a value of four; else, determining if a subsequent segment type is valid; if the subsequent segment type is valid, setting the TDLL adjustment to a value of zero; if the subsequent segment type is not valid, setting the TDLL adjustment to a value of four; and applying the TDLL adjustment to the TDLL. The first and second specifications can be either the 143r1 specification or the Legato specification.

A technical advantage of the present invention is that it provides a method and system for reconciling the target descriptor lengths of a SCSI extended copy command such that extended copy commands built to either the 143r1 specification or to the Legato implementation of the 143r1 specification can be accepted and effectively executed by a copy manager device.

Another technical advantage of the method and system for reconciling target descriptor lengths of a SCSI extended copy command of this invention is that they can comprise, and be implemented within, a Fibre Channel-to-SCSI storage router within a Fibre Channel-to-SCSI storage area network.

BRIEF DESCRIPTION OF THE DRAWINGS

A more complete understanding of the present invention and the advantages thereof may be acquired by referring to the following description, taken in conjunction with the accompanying drawings, in which like reference numbers indicate like features and wherein:

FIG. 3 is a conceptual diagram of a Fibre Channel-to-SCSI network for implementing an embodiment of the method and system of this invention, where the network has multiple hosts, multiple routers and multiple target devices.

DETAILED DESCRIPTION OF THE INVENTION

Figure 1:
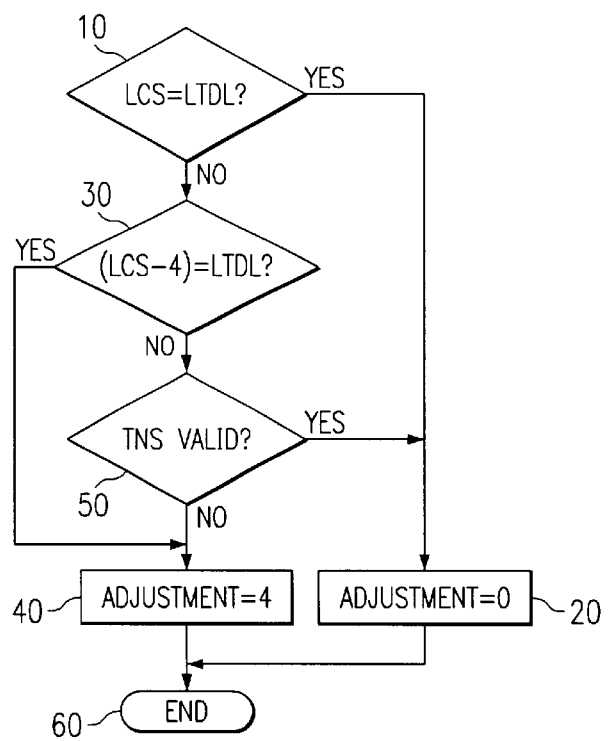
FIG. 1 is a flow chart of one embodiment of the method of this invention to determine target descriptor segment length adjustment.

Preferred embodiments of the present invention are illustrated in the FIGUREs, like numerals being used to refer to like and corresponding parts of various drawings.

The present invention provides a method and system for reconciling target descriptor lengths of the SCSI extended copy command so that the extended copy command target descriptor list can be properly processed by a copy manager device. The system of the present invention can comprise computer executable software instructions (copy manager software) for determining the proper target descriptor lengths. The computer executable software instructions of this invention can be stored in memory within a router, such as a Fibre Channel-to-SCSI manufactured by Crossroads Systems, Inc., of Austin, Tex. The memory can be RAM, ROM, or other storage media, such as a hard drive, as known to those in the art. The computer processor can be any computing device capable of interpreting and executing software instructions. The method of this invention can thus be implemented by a system of this invention comprising a router on which the aforementioned software instructions can be executed.

In accordance with the teachings of the method and system of the present invention, the copy manager, which can be a Fibre Channel-to-SCSI router, can receive an extended copy command from a host and then perform a backup operation in accordance with the extended copy command specification. In this way, the host resources are free to perform other tasks within the computer network. The 143r1 specification was one of the preliminary specifications for the SCSI protocol extended copy, and many early implementations of the extended copy command were written using this specification. However, different implementations of the extended copy command exist, in particular, the Legato implementation, that are not interoperable with each other. Some hosts expect the extended copy command to adhere to one specification, while other hosts expect the extended copy command to adhere to a different specification, particularly with respect to the target descriptor lengths.

The extended copy command comprises in part a parameter list that defines a target descriptor list. The target descriptor list comprises target descriptions for each target device that identify the targets the command will be using and the data movements that are to be performed between the targets. Each target's descriptor contains information that identifies the device, such as the device type, the device address, and the type of information the target device will process. To parse the target descriptor, one of the fields inside the target descriptor, the target descriptor length, is used. The 143r1 specification defines the target descriptor length as equal to the number of bytes on the target descriptor, including the header information. In other words, the target descriptor length should be equal to the number of bytes of the target descriptor including any device specific information.

Although the 143r1 specification is unambiguous, one of the early implementations, the Legato implementation, defined a slightly different version claiming to be compliant with the 143r1 specification, but which used a target descriptor length equal to the length of the descriptor minus the length of the header. This length is equal to the length of the descriptor minus four bytes. As a result, backup software on hosts adhering to the 143r1 specification accept one target descriptor length, and backup software hosts adhering to the Legato implementation to provide extended copy commands to a copy manager, such as a router, accept a different target descriptor length.

Therefore, when a copy manager having software set up for one extended copy command specification receives an extended copy command configured under a different specification (such as Legato), the differing descriptor length definitions can result in incorrect data pointers within the transferred data, in corrupted data, and/or in lost data. The copy manager device can also fail to interpret the extended copy command altogether and error-out the command. The extended copy command will then fail.

The method and system of this invention provide a means to determine the proper target descriptor length to use when executing an extended copy command. The method comprises first attempting to parse the target descriptor according to, for example, either the 143r1 specification, or the Legato implementation, and, if the initial parsing fails, attempting to parse the target descriptor according to the other implementation and so accept commands built to either specification. If neither the 143r1 or the Legato specification provide useful information, then the method and system of this invention can error out the extended copy command.

In order to properly process a target descriptor list associated with an extended copy command, it is thus necessary to know the length of each target descriptor segment within the extended copy (i.e., to know the specification used by the device issuing the command)command. Because some backup software sets the target descriptor length field to be the actual size of the target descriptor segment (as specified in the 143r1 specification) and other software sets the target descriptor length field to be four bytes less than the actual size, the copy manager software must determine which method is being used for each extended copy command received. The method and system of this invention can provide this capability.

The present invention comprises a method of discovering an adjustment to add to each target descriptor segment length in the copy manager device to get the size of the segment as specified in the received extended copy command. The adjustment can have a value of either zero or four, for example, when reconciling the Legato specification and the 143r1 specification. The method of this invention reconciles the target descriptor lengths in this manner once on each extended copy command, and the appropriate adjustment is added to the length of each target descriptor list length. It is contemplated to be within the scope of the present invention that different implementations of the extended copy command standard can be compensated for in a similar manner as described herein, with the adjustment value being set as appropriate for a particular implementation. An embodiment of the present invention can thus be used to adjust implementations of the extended copy command other than the Legato implementation.

FIG. 1 is a simplified flow chart illustrating one embodiment of the method of this invention to determine target descriptor segment length adjustment. At step 10, the method of this invention determines if the length of the current segment (here denoted by "LCS") is equal to the length set in the target descriptor length field in the target descriptor list. The length of the current segment is the value of the unadjusted target descriptor length field for the current segment. If the length of the current segment is equal to the length set in the target descriptor list, then at step 20 a target descriptor list length adjustment is set equal to zero. The method of this invention then ends at step 60 until a subsequent extended copy command is received by the copy manager device.

If instead the length of the current segment is not equal to the length set in the target descriptor list, then at step 30 the method of this invention determines if the length of the current segment minus four (bytes) is equal to the length of the target descriptor list. If so, then at step 40 the target descriptor length adjustment is set equal to four and the method of this invention ends at step 60 for the current extended copy command.

If instead, at step 30, the length of the current segment minus four is not equal to the length of the target descriptor list, then, at step 50, the method of this invention determines if the type of the next segment is a valid target descriptor ID according to the extended copy command specification. The type of the next segment is determined by the value of the descriptor type code contained in the target descriptor segment at the address of the next segment. The address of the next segment is calculated as equal to the address of the current segment plus the length of the current segment. The address of the current segment can be initialized to the first target descriptor segment when an extended copy command is first received.

If the type of next segment is a valid target descriptor ID, then the target descriptor length adjustment is set to zero at step 20 and the method of this invention ends at step 60 for the current extended copy command. If instead the type of next segment is not a valid target descriptor ID, then at step 40 the target descriptor length adjustment is set to four. The method of this invention then ends at stop 60 for the current extended copy command.

As discussed above, the target descriptor length adjustment processing is performed once on each extended copy command (e.g., on the first target descriptor segment). The determined adjustment is then used on the length of each target descriptor segment within that command. The method of this invention can be repeated for each new extended copy command received.

The present invention can comprise computer-executable software instructions stored within the memory of the copy manager device. The copy manager device can be a router, such as a Fibre Channel-to-SCSI router. The software of the system of this invention can be retrofitted to a copy manager device, such as a router, at low cost.

The method and system of this invention can receive and process extended copy commands issued by hosts on either the Fibre Channel side of a Fibre Channel-to-SCSI network or on the SCSI side of the network. The method and system of the present invention can thus automatically sense the target descriptor length specification used by an extended copy command and compensate for it.

The extended copy command can be used for backup of multiple sources and multiple destinations, such as data from multiple sources going to one or more tape devices for backup, or data going from a single source tape to one or more destinations for a restore operation. The extended copy command can thus be used either as a backup function or as a restore function.

The extended copy command can comprise a group of descriptors, including target descriptors and data movement segment descriptors, that determine how much data will be moved from a source to a target. The extended copy command can contain multiple target descriptors and multiple movement segment descriptors. Furthermore, inline data can be embedded within an extended copy command. Inline data is data that is included by a host in the extended copy command parameter list so that instead of the data being provided by the source, it is embedded within the command itself.

The parameter list of the extended copy command can thus be used as a source of data to send to a target destination. For example, a table of contents can be put together in a block included in the parameter list and then written out on a tape followed by the data to which it refers. The method and system of this invention can process extended copy commands having inline data and multiple target and movement segment descriptors.

Further, the method and system of this invention can be used in combination with the invention disclosed in a related patent application entitled "METHOD AND SYSTEM FOR OVERLAPPING DATA FLOW WITHIN A SCSI EXTENDED COPY COMMAND" (the "Overlapping Data Application"), Ser. No. "unassigned," filed on Feb. 28, 2002 to John Tyndall. The Overlapping Data Application is hereby fully incorporated by reference.

Figure 2:
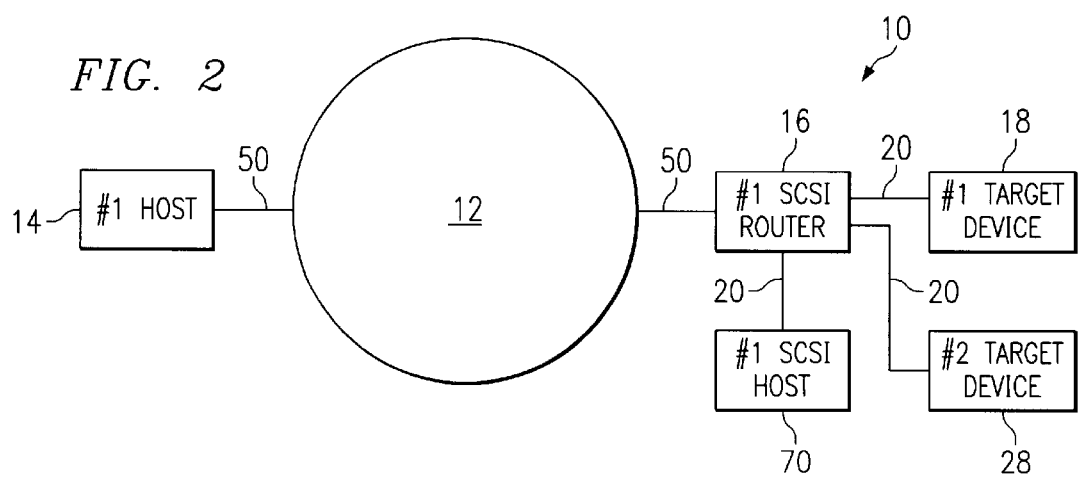
FIG. 2 is a conceptual diagram illustrating a Fibre Channel-to-SCSI network for implementing one embodiment of the method and system of this invention.

FIG. 2 is a conceptual diagram of a Fibre Channel-to-SCSI network in which one embodiment of the method and system of this invention can be implemented. In FIG. 2, there appears a conceptual diagram of Fibre Channel network 10 that can include network link 12 for connecting #1 Fibre Channel host 14 with #1 Fibre Channel-to-SCSI router 16 via network links 50. #1 target device 18 and #2 target device 28 connect to #1 Fibre Channel-to-SCSI router 16 via SCSI network links 20. FIG. 2 also includes #1 SCSI host 70, connected to #1 Fibre Channel-to-SCSI router 16 via a second SCSI network link 20. Network links 50 can be any Fibre Channel network connection and SCSI network links 20 can be any SCSI network connection.

FIG. 2 shows a simple one Fibre Channel host, one SCSI host, one target and one router Fibre Channel-to-SCSI network, but the method and system of this invention can be implemented in a Fibre Channel-to-SCSI network having multiple Fibre Channel hosts, multiple SCSI hosts, multiple Fibre Channel-to-SCSI routers and multiple network target devices. The target devices can be either source or destination devices, such as tape drives, CD-ROMs, hard drives, or other storage devices as known to those in the art.

In operation, either #1 Fibre Channel host 14 or #1 SCSI host 70 can issue an extended copy command to #1 Fibre Channel-to-SCSI router 16. #1 Fibre Channel-to-SCSI router 16 can then execute the command, for example, a backup command involving #1 target device 18 and #2 target device 28.

FIG. 3 shows a modified Fibre Channel network 10 to illustrate the capability of the present invention to process extended copy commands from multiple Fibre Channel and/or SCSI hosts to multiple target devices using multiple Fibre Channel-to-SCSI routers. Fibre Channel network 10 now includes #2 Fibre Channel host 22 and #2 Fibre Channel-to-SCSI router 30 communicatively connected to Fibre Channel network link 12 via network links 50.

Fibre Channel network 10 also includes #2 SCSI host 80, communicatively connected to #2 SCSI router 30 via a network link 20. Further, #2 SCSI router 30 is communicatively connected to #3 target device 32 and #4 target device 34 via networks links 20.

FIG. 3 shows a closed Fibre Channel network 10, but it is possible to add additional SCSI routers, Fibre Channel hosts, SCSI hosts and target devices to Fibre Channel network 10. Such a modification is contemplated as within the scope of this invention. The method and system of the present invention can thus function equally well in a network having multiple hosts, multiple routers and multiple target devices. The number of routers, target devices and hosts is limited by the router, and the SCSI and Fibre Channel network protocol capacity.

The present invention can provide the functionality disclosed in this description in applications involving networks in which different hosts may each use different specification extended copy commands. For example, one host may use the Legato implementation while another host within the same network can use the 143r1 specification extended copy command.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for reconciling extended copy command target descriptor lengths, comprising, in a router:

receiving an extended copy command from a first host;

comparing a first segment length to a target descriptor list length ("TDLL"), wherein said first segment length is the segment length as set by a first specification associated with said first host and wherein said TDLL is the segment length as set by a second specification associated with said router;

if said first segment length is equal to said TDLL, setting a TDLL adjustment to a value of zero;

if said first segment length is not equal to said TDLL, determining if said first segment length minus four bytes is equal to said TDLL;

If said first segment length minus four bytes is equal to said TDLL, then setting said TDLL adjustment to a value of four;

else, determining if a subsequent segment type is valid;

if said subsequent segment type is valid, setting said TDLL adjustment to a value of zero;

if said subsequent segment type is not valid, setting said TDLL adjustment to a value of four; and applying said TDLL adjustment to said TDLL.

* * * * *

UNITED STATES PATENT AND TRADEMARK OFFICE
CERTIFICATE OF CORRECTION

PATENT NO. : 6,650,656 B2
DATED : November 18, 2003
INVENTOR(S) : John F. Tyndall It is certified that error appears in the above-identified patent and that said Letters Patent is hereby corrected as shown below:

<u>Title page,</u>
Item [74], *Attorney, Agent, or Firm*, delete "Friedenrich" and insert -- Freidenrich --

Signed and Sealed this

Thirteenth Day of April, 2004

JON W. DUDAS
*Acting Director of the United States Patent and Trademark Office*